(12) United States Patent
Kim et al.

(10) Patent No.: US 7,001,022 B2
(45) Date of Patent: Feb. 21, 2006

(54) ILLUMINATION SYSTEM AND PROJECTION SYSTEM ADOPTING THE SAME

(75) Inventors: Sung-ha Kim, Gyeonggi-do (KR); Kirill Sergeevich Sokolov, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 322 days.

(21) Appl. No.: 10/288,594

(22) Filed: Nov. 6, 2002

(65) Prior Publication Data

US 2003/0090632 A1     May 15, 2003

(30) Foreign Application Priority Data

Nov. 6, 2001 (KR) .................... 2001-68816

(51) Int. Cl.
G03B 21/00 (2006.01)
G03B 21/20 (2006.01)

(52) U.S. Cl. .................... 353/31; 353/102

(58) Field of Classification Search .............. 353/31, 353/33, 102; 359/15; 362/551
See application file for complete search history.

(56) References Cited

U.S. PATENT DOCUMENTS

| | | | | |
|---|---|---|---|---|
| 4,711,512 A | | 12/1987 | Upatnieks | 345/7 |
| 5,491,765 A | | 2/1996 | Matsumoto | 385/33 |
| 5,677,196 A | * | 10/1997 | Herron et al. | 436/518 |
| 5,772,304 A | | 6/1998 | Smith | 362/31 |
| 5,795,049 A | * | 8/1998 | Gleckman | 353/122 |
| 6,086,212 A | * | 7/2000 | Onishi et al. | 362/31 |
| 6,222,598 B1 | * | 4/2001 | Hiyama et al. | 349/65 |
| 6,224,216 B1 | * | 5/2001 | Parker et al. | 353/31 |
| 6,412,953 B1 | * | 7/2002 | Tiao et al. | 353/98 |
| 6,799,849 B1 | * | 10/2004 | Kim et al. | 359/15 |

FOREIGN PATENT DOCUMENTS

| | | |
|---|---|---|
| EP | 0 377 988 | 7/1990 |
| EP | 0 609 812 | 8/1994 |
| JP | 3-2745 | 1/1991 |
| JP | 6-118374 | 4/1994 |
| JP | 9-189809 | 7/1997 |
| JP | 9-236795 | 9/1997 |
| JP | 9-274252 | 10/1997 |
| JP | 10-123321 | 5/1998 |
| JP | 2000-292745 | 10/2000 |
| JP | 2001-512584 | 8/2001 |
| WO | 99/49358 | 9/1999 |
| WO | WO 99/49358 | 9/1999 |
| WO | 01/09663 | 2/2001 |

* cited by examiner

*Primary Examiner*—Christopher Mahoney
(74) *Attorney, Agent, or Firm*—Staas & Halsey LLP

(57) ABSTRACT

An illumination system includes at least one light emitting device to emit a light beam having different wavelengths, a focusing lens to condense the light beam emitted from the light emitting device, and a waveguide having an incident surface inclined at a predetermined angle upon which the light beam condensed by the focusing lens is incident. A projection system includes at least one light emitting device to emit a light beam having the different wavelengths, a focusing lens to condense the light beam emitted from the light emitting device, a waveguide having an incident surface inclined at a predetermined angle on which the light beam is condensed by the focusing lens, a display device to form an image by processing the light beam passing through the waveguide according to an input image signal, and a projection lens unit to magnify the image formed by the display device and to project the magnified image toward a screen.

78 Claims, 10 Drawing Sheets

ILLUMINATION SYSTEM AND PROJECTION SYSTEM ADOPTING THE SAME

CROSS-REFERENCE TO RELATED APPLICATIONS

This application claims the benefit of Korean Application No. 2001-68816, filed Nov. 6, 2001, in the Korean Intellectual Property Office, the disclosure of which is incorporated herein by reference.

BACKGROUND OF THE INVENTION

1. Field of the Invention

The present invention relates to an illumination system and a projection system adopting the same, and more particularly, to an illumination system which can realize a color image without a color wheel, and a projection system adopting the same.

2. Description of the Related Art

Referring to FIG. 1, a conventional projection system includes a light source 100, a first relay lens 102 to condense the light beam emitted from the light source 100, a color wheel 105 to split light beams incident from the first relay lens 102 into R, G and B color light beams, a fly eye lens 107 to make the light beam passing through the color wheel 105 uniform, a second relay lens 110 to condense the light beam passing through the fly eye lens 107, a display device 112 to form a color image from the R, G and B color light beams sequentially input through the color wheel 105, and a projection lens system 115 to make an image formed by the display device 112 proceed toward a screen 118.

A xenon lamp, a metal-halide lamp, or a UHP lamp is used as the light source 100. These lamps emit too much unnecessary infrared and ultraviolet energy. Accordingly, since much heat is generated, a cooling fan is used to cool the system. However, the cooling fan also acts as a noise source. Also, since the spectrum of the lamp light source is widely distributed across many wavelengths, due to a narrow color gamut, the selection of color is limited, color purity is inferior, and the life span is short. Thus, long-term use of the lamp is not possible.

In the conventional projection system, to realize a color image, the color wheel 105 is rotated by driving a motor (not shown) at a high speed so that R, G and B color light beams are sequentially illuminated onto the display device 112. R, G and B color filters are equally arranged on the entire surface of the color wheel 105. The color wheel 105 rotates three turns for each image. The three colors are sequentially used, but only one color is used for each rotation, thus, ⅔ of the light is lost. Also, more light is lost at a boundary portion between neighboring color filters.

Furthermore, since the color wheel 105 rotates at a high speed, noise is generated. Also, the mechanical movement of the driving motor has an adverse effect on stability. Further, due to mechanical limitations of the driving motor, it is difficult to obtain a speed over certain ranges and a color breakup phenomenon occurs. Also, since the price of the color wheel is very high, the manufacturing cost increases.

SUMMARY OF THE INVENTION

Accordingly, it is an object of the present invention to provide an illumination system capable of forming a color image without a color wheel by using a light emitting device to emit a light beam having a predetermined wavelength so that color purity and color gamut is improved, and a projection system adopting the illumination system.

It is another object of the present invention to provide an illumination system having at least one waveguide to guide a light beam without loss of light with a reduced cross section of the light beam, so that the volume of the system is reduced and the efficiency of the lighting improves, and a projection system adopting the illumination system.

Additional objects and advantages of the invention will be set forth in part in the description which follows and, in part, will be obvious from the description, or may be learned by practice of the invention.

The foregoing and additional objects of the present invention are achieved by providing a light emitting device to emit a light beam having a wavelength; a holographic optical element to change an optical path of the light beam emitted from the light emitting device; and a waveguide to receive the light beam from the holographic optical element and to guide the received light beam.

The light emitting device may have an array structure, and the light emitting device may be a light emitting diode (LED), a laser diode, an organic electro luminescent (EL), or a field emission display (FED).

The illumination system may further include a prism array to make the light beam passing through the waveguide proceed in a single parallel direction.

The holographic optical element may be arranged at an upper or a lower portion of the waveguide.

The illumination system may further include a parallel beam forming unit to make parallel the light beam emitted from the light emitting device or light emitting device array.

The parallel beam forming unit may be a collimating lens array or Fresnel lens array.

The illumination system may further include an optical path changer to change a path of the light beam passing through the prism array.

A plurality of the light emitting devices or the light emitting device arrays may be horizontally arranged in a line.

The optical path changer may be a dichroic filter to reflect or transmit the light beam passing through the prism array according to the wavelength thereof.

The optical path changer may be a cholesteric band modulation filter to reflect or transmit the light beam passing through the prism array according to the polarization direction and wavelength thereof.

The cholesteric band modulation filter may have a first mirror surface to reflect a light beam of right circular polarization and to transmit a light beam of left circular polarization, and a second mirror surface to transmit the light beam of right circular polarization and reflect the light beam of left circular polarization, with respect to a light beam having a predetermined wavelength.

The light emitting device or light emitting device array, the holographic optical element, and the waveguide may be further arranged in a multiple layer structure.

A plurality of the light emitting devices or light emitting device arrays may be separated at a predetermined angle.

The optical path changer may be an X prism or X type dichroic filter.

According to an aspect of the present invention, the light emitting device or light emitting device array, the holographic optical element, and the waveguide may be arranged in a multiple layer structure.

The prism array may be formed integrally with the waveguide at an exit end portion of the waveguide.

The foregoing and other objects of the present invention may also be achieved by providing a light emitting device to emit a light beam having a wavelength; a holographic optical element to change an optical path of the light beam emitted from the light emitting device; and a waveguide to receive the light beam from the holographic optical element and to guide the received light beam.

The foregoing and other objects of the present invention may also be achieved by providing a plurality of light emitting devices to emit light beams having different wavelengths; a plurality of holographic optical elements, corresponding to the light emitting devices, to change optical paths of the light beams emitted from the light emitting devices; and a waveguide to guide light beams incident from the holographic optical elements in a same direction.

The foregoing and other objects of the present invention may also be achieved by providing a light emitting device to emit a light beam having different wavelengths; a focusing lens to condense the light beam emitted from the light emitting device; and a waveguide having an inclined incident surface, upon which the condensed light is incident.

The foregoing and other objects of the present invention may also be achieved by providing a light emitting device to emit a light beam having different wavelengths; a diffractive optical element to change an optical path of the light beam emitted from the light emitting device; and a waveguide to guide the light beam which has passed through the diffractive optical element.

The foregoing and other objects of the present invention may also be achieved by providing a light emitting device to emit a light beam having different wavelengths; a holographic optical element to change a proceeding path of the light beam emitted from the light emitting device; a waveguide to guide the light beam passing through the holographic optical element; a display device to form an image by processing the light beam passing through the waveguide according to an input image signal; a screen; and a projection lens unit to magnify the image formed by the display device and to project the magnified image toward the screen.

According to an aspect of the present invention, the above projection system may further include a fly eye lens to make uniform the strength of the light beam emitted from the second parallel beam forming unit, and a relay lens to condense the light beam passing through the fly eye lens on the display device.

The foregoing and other objects of the present invention may be achieved by providing a display device to form an image by processing the light beam passing through the waveguide according to an input image signal; a screen; and a projection lens unit to magnify the image formed by the display device and to project the magnified image towards the screen.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
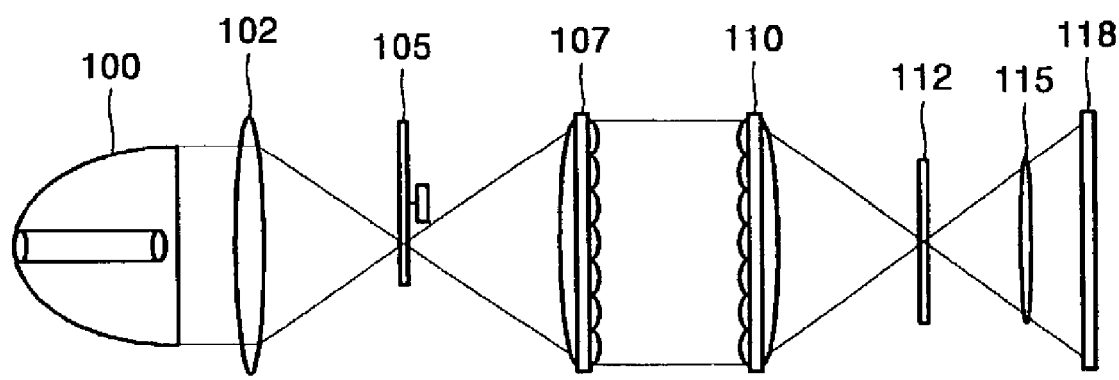
FIG. 1 is a view showing the structure of a conventional projection system.

Reference will now be made in detail to the present preferred embodiments of the present invention, examples of which are illustrated in the accompanying drawings, wherein like reference numerals refer to like elements throughout.

Figure 2:
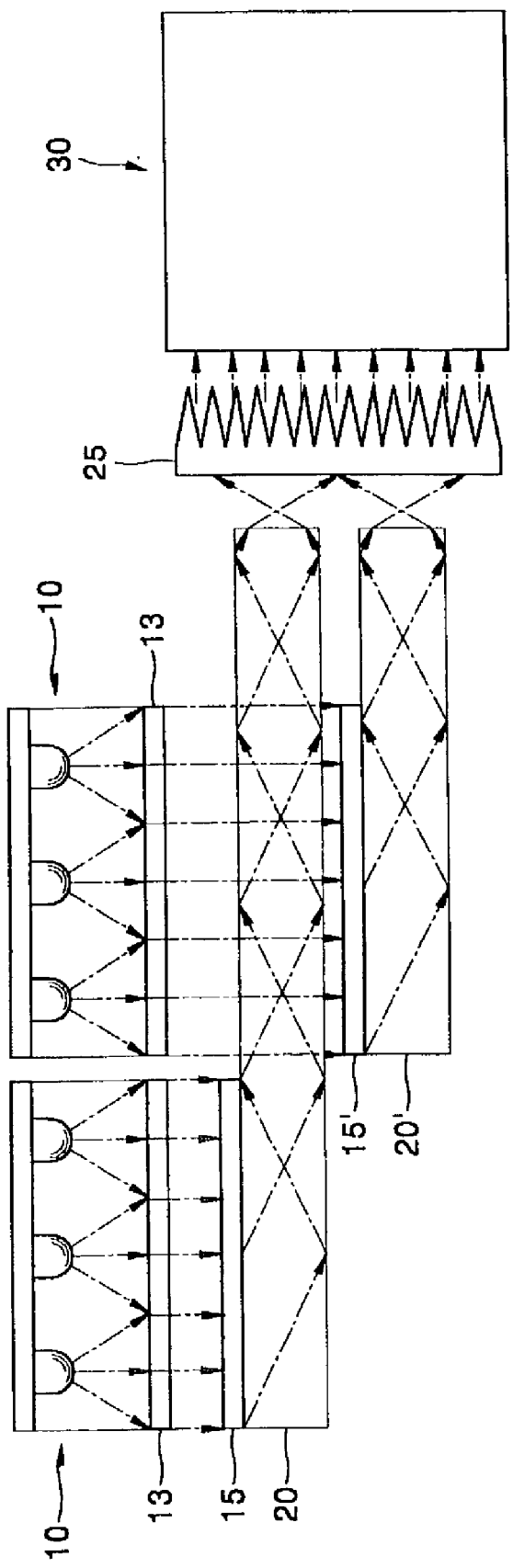
FIG. 2 is a front view of an illumination system according to a first embodiment of the present invention.

Referring to FIG. 2, an illumination system according to a first embodiment of the present invention includes at least one light emitting device 10 to emit a light beam having a predetermined wavelength, a holographic optical element 15 to change a proceeding path of the light beam emitted from the light emitting device 10, and a waveguide 20 to guide the light beam passing through the holographic optical element 15.

Figure 4:
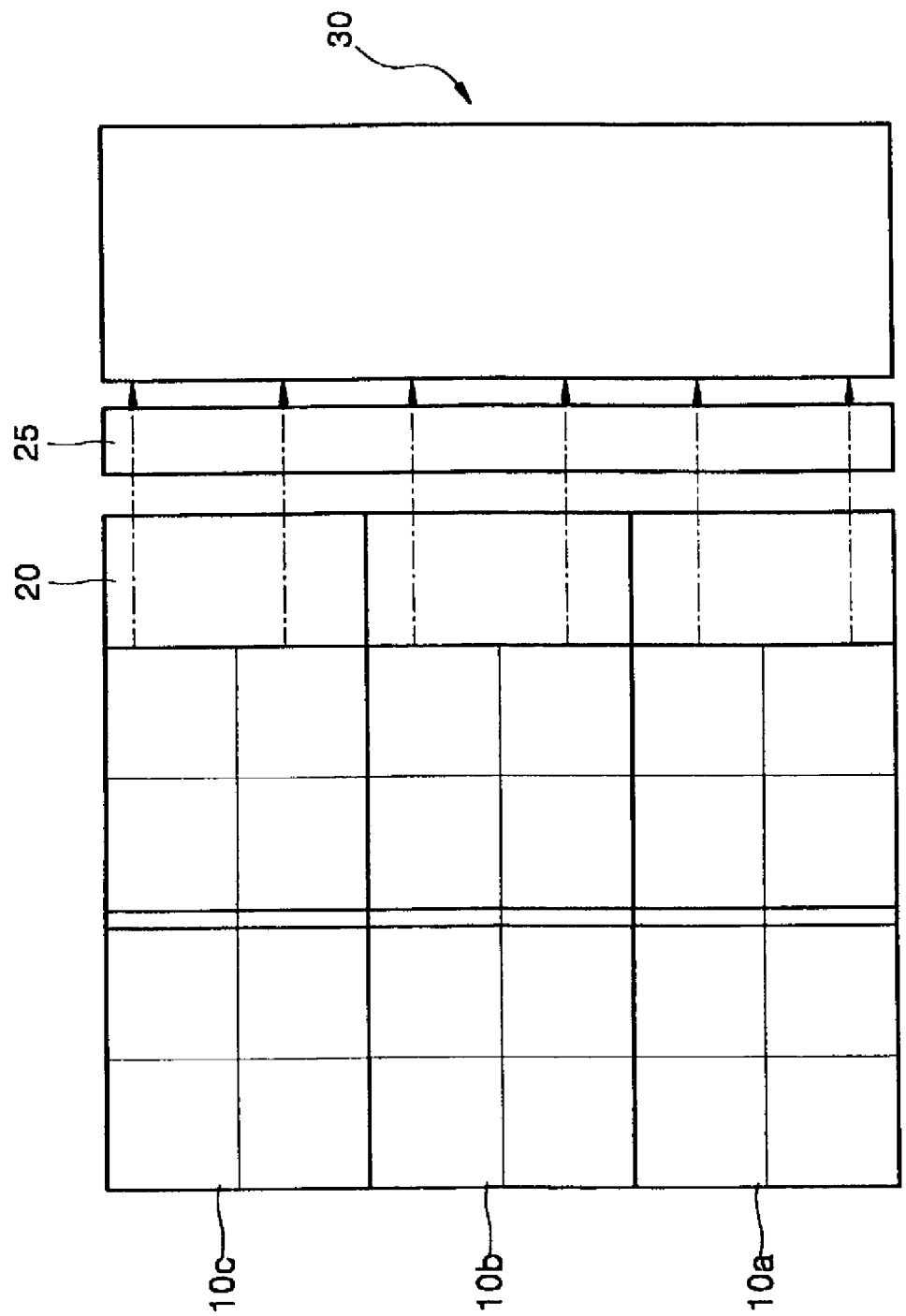
FIG. 4 is a plan view of the illumination system of FIG. 2.

An LED (light emitting diode), an LD (laser diode), an organic EL (electro luminescent), or an FED (field emission display) may be used as the light emitting device 10. Also, an array structure in which the light emitting devices 10 are arranged in a 2-dimensional array may be used. The light emitting device 10 or the light emitting device array can be formed to emit light beams having different wavelengths. For example, as shown in FIG. 4, the light emitting device 10 or the light emitting device array may include a first light emitting device 10a to emit a light beam having a red (R) wavelength, a second light emitting device 10b to emit a light beam having a green (G) wavelength, and a third light emitting device 10c to emit a light beam having a blue (B) wavelength.

A parallel beam forming unit 13, such as a collimating lens array or a Fresnel lens array, to make parallel the light beams emitted from the light emitting devices 10 or light emitting device arrays 10a, 10b, and 10c can be further provided. The holographic optical element 15 makes the parallel light beams from the parallel beam forming unit 13 incident on the waveguide 20 at a predetermined angle. The incident light beam is totally reflected inside the waveguide 20. The holographic optical element 15 diffracts the light beam incident on the waveguide 20 at a predetermined angle so that a cross section of the light beam is reduced inside the waveguide 20. That is, it can be seen that the cross section of a light beam proceeding inside the waveguide 20 after passing through the holographic optical element 15 is reduced as compared to the cross section of the light beam incident on the holographic optical element 15. Therefore, not only the volume of the illumination system, but also loss of light can be reduced.

The holographic optical element 15 can be installed at the upper or lower portion of the waveguide 20. However, when the light beam passing through the holographic optical element 15 and starting from one end portion of the waveguide 20 is totally reflected by a lower surface of the waveguide 20, and incident on an upper surface thereof, a diffraction angle or the length of the holographic optical element 15 must be adjusted so as not to be reflected back to the holographic optical element 15. The holographic optical element 15 can be replaced by a diffractive optical element having the same function.

Figure 3A:
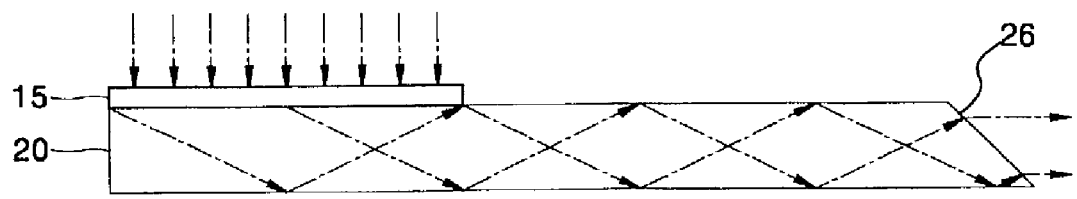
FIGS. 3A through 3C are views showing various examples of waveguides used in the illumination system of FIG. 2.
Figure 3B:
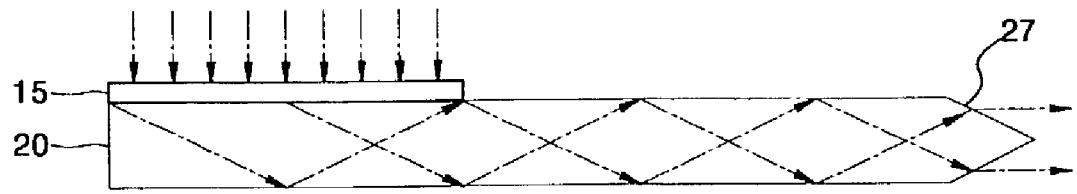
Figure 3C:
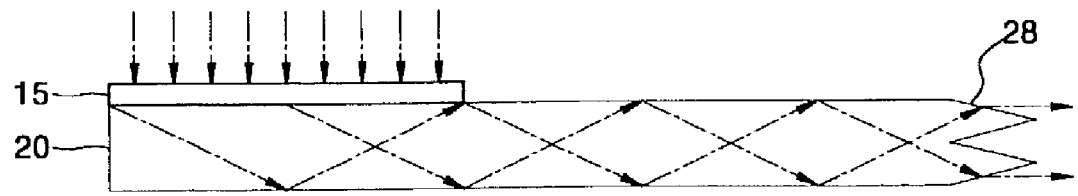

Also, a prism array 25 to make parallel light beams passing through the waveguide 20 and proceeding in different directions is arranged at an end portion of an exit side of the waveguide 20. That is, the light beams coming out of the waveguide 20 in different directions from one another are condensed by the prism array 25 to proceed in one direction. Although the prism array 25 is separate from the waveguide 20 in the described embodiment, the prism array 25 can be integrally formed at the exit side portion of the waveguide 20. Alternatively, as shown in FIG. 3A, the end portion of the exit side of the waveguide 20 can be formed to have a surface 26 inclined at a predetermined angle which performs the same function as the prism array 25. Also, as shown in FIGS. 3B and 3C, the waveguide 20 can be formed such that the end portion of the exit side of the waveguide 20 has at least one prism surface 27 or 28. Accordingly, the light beams proceeding in different directions are received by the waveguide 20 and proceed in a single direction after passing through the waveguide. Thus, the light beam emitted from the light emitting device 10 passes through the prism arrays 25, 26, 27 and 28 while the cross section of the light beam is reduced by the waveguide 20.

Furthermore, to secure a sufficient amount of light, the light emitting device 10 or light emitting device array is provided in multiple numbers. Also, additional holographic optical elements 15' and waveguides 20' can be provided. Here, the waveguides 20 and 20' are arranged to have a step shape on a different plane from that on which a neighboring waveguide 20 is disposed, so that proceeding paths of the light beams passing through the waveguides 20 and 20' do not disturb each other.

Meanwhile, an optical path changer 30 to change a proceeding path of the light beam passing through the prism array 25, 26, 27, or 28 can be further provided. A detailed example of the optical path changer 30 will be described later.

Figure 5:
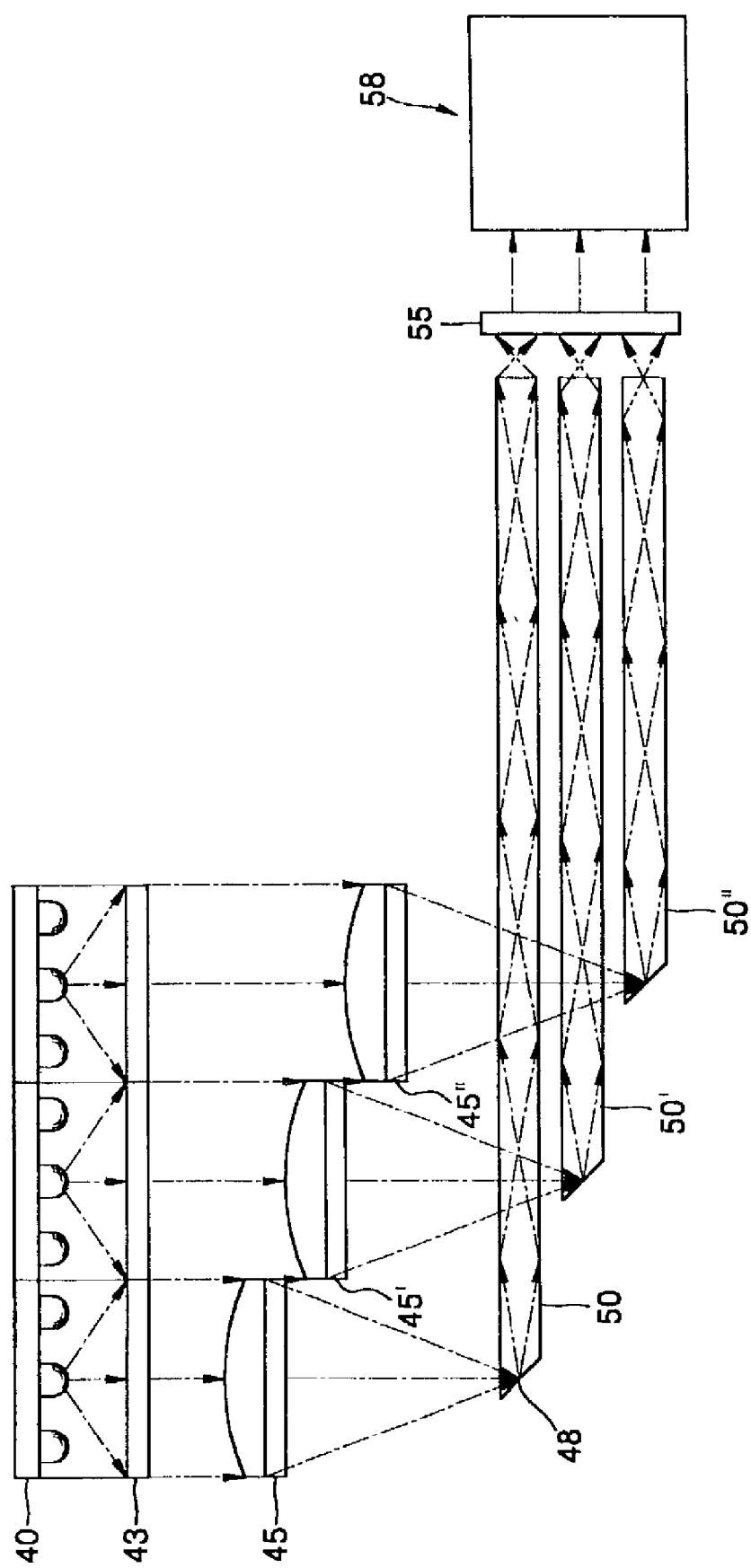
FIG. 5 is a view showing the structure of an illumination system according to a second embodiment of the present invention.

Referring to FIG. 5, an illumination system according to a second embodiment of the present invention includes at least one light emitting device or light emitting device array 40, a waveguide 50 to guide a proceeding path of a light beam, and a focusing lens 45 to condense a light beam toward an input end portion of the waveguide 50. An LED (light emitting diode), an LD (laser diode), an organic EL (electro luminescent), or an FED (field emission display) can be used as the light emitting device or light emitting device array 40.

An input end portion of the waveguide 50 has a surface 48 inclined at a predetermined angle so that a light beam condensed by the focusing lens 45 is totally reflected in the waveguide 50. As an example, the surface 48 may be inclined at about 45°. Here, since the light beam is condensed at a point of the input end portion of the waveguide 50 by the focusing lens 45, the cross section of the light beam passing through the waveguide 50 can be further reduced.

Also, the light emitting device or light emitting device array 40 can be provided in multiple numbers and arranged linearly. Here, the focusing lenses 45, 45' and 45" corresponding to the respective light emitting devices or light emitting device arrays 40 are arranged on different planes in a step-like form. The light beams condensed by the focusing lenses 45, 45' and 45" are respectively guided by waveguides 50, 50', and 50" disposed on different planes. As a result, a sufficient amount of light can be transmitted. While the light emitting devices or light emitting device arrays 40 are arranged linearly, light emitting devices or light emitting device arrays 40 emitting light beams having different wavelengths can be formed as above.

A first parallel beam forming unit 43 to make parallel the light beam emitted from the light emitting device or light emitting device array 40 is provided between the light emitting device or light emitting device array 40 and the focusing lenses 45, 45' and 45". A second parallel beam forming unit 55 to make parallel the light beams emitted from the waveguides 50, 50', and 50" is provided at the exit end portions of the waveguides 50, 50', and 50". The first and second parallel beam forming units 43 and 55 may be collimating lens arrays or Fresnel lens arrays. Here, an optical path changer 58 to change a proceeding path of the light beam passing through the second parallel beam forming unit 55 can be further provided.

Figure 6:
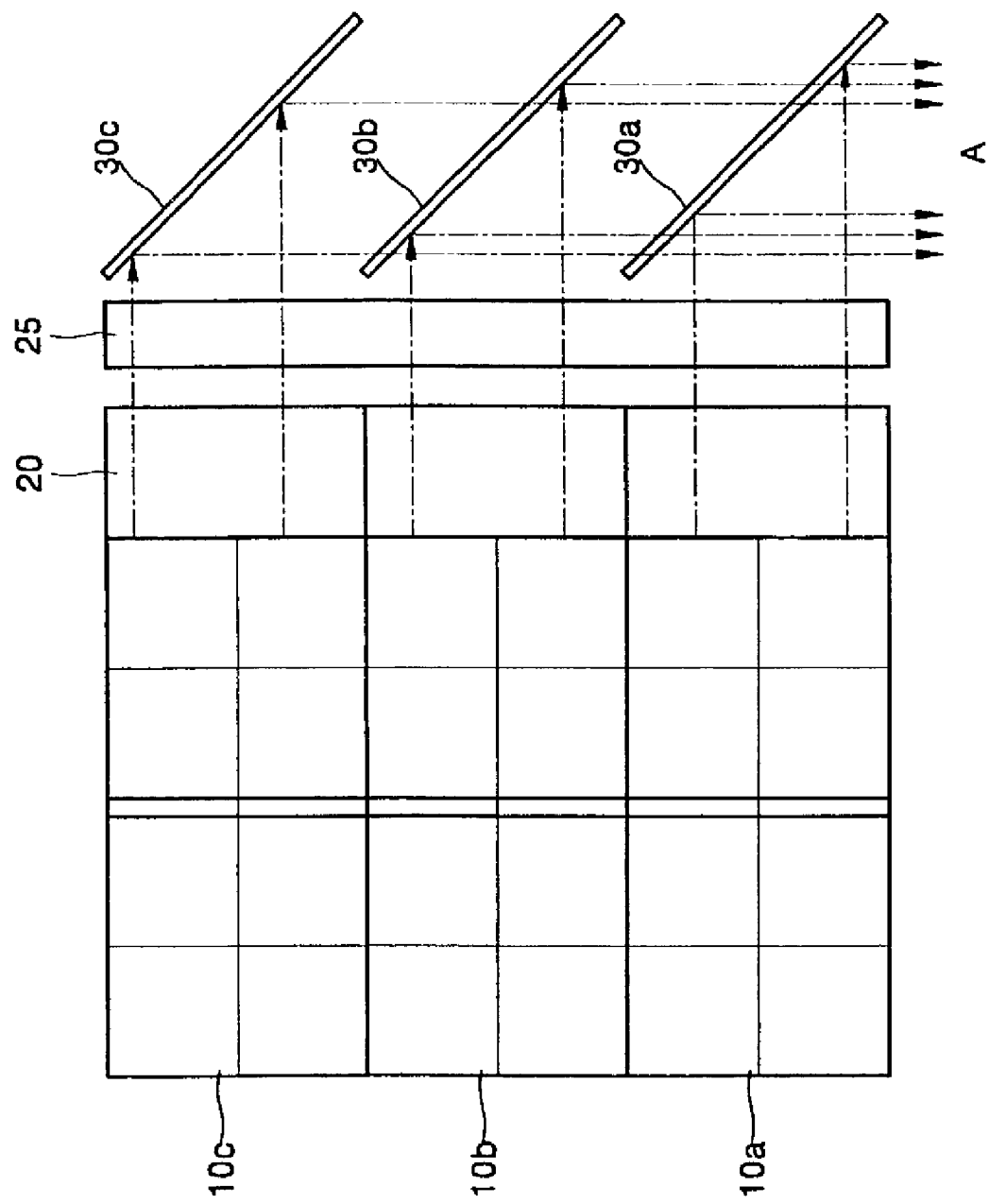
FIGS. 6 through 8 are views showing various examples of an optical path changer used in the illumination systems of the present invention.
Figure 7:
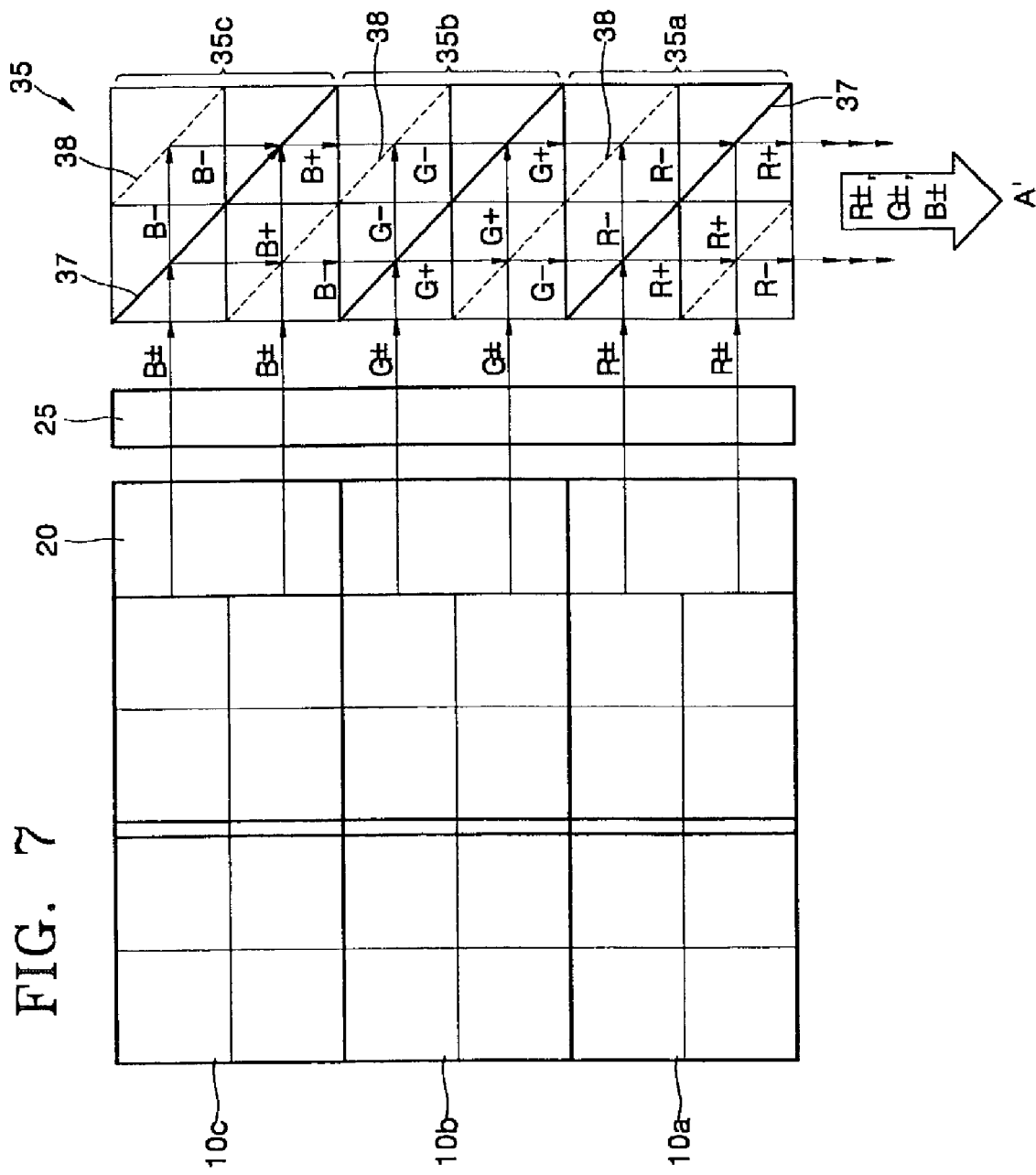
Figure 8:
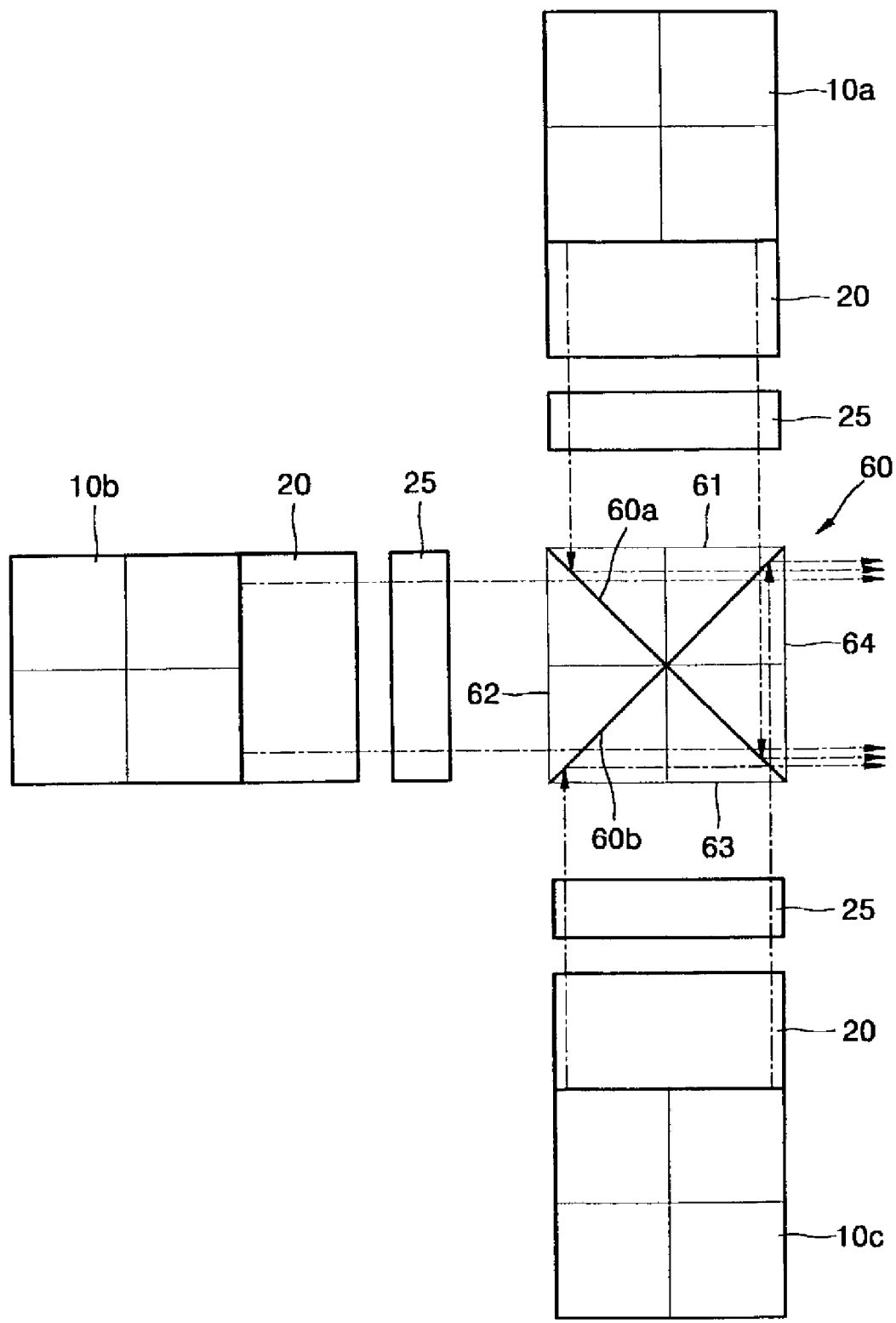

FIGS. 6 through 8 show various examples of the optical path changers 30 and 58. Here, although the examples of the optical path changers 30 and 58 can be applied to first and second embodiments, reference numerals in the first embodiment of the present invention will be used in the following description.

The light emitting device and light emitting device array 10 can be formed of the first, second, and third light emitting devices and light emitting device arrays 10a, 10b, and 10c respectively emitting light beams having R, G, and B wavelengths, and can be arranged linearly in a horizontal direction, as shown in FIGS. 6 and 7. Also, to secure a sufficient amount of light, the first, second, and third light emitting devices and light emitting device arrays 10a, 10b, and 10c can be provided further in multiple numbers. The light emitting devices and light emitting device arrays 10a, 10b, and 10c can be arranged in multiple layers in a vertical direction, in addition to the arrangement in a horizontal direction. When the light emitting devices and light emitting device arrays 10a, 10b, and 10c are provided in multiple numbers, the holographic optical element 15, the focusing lens 45, or the waveguides 20 and 50 are provided in corresponding multiple numbers. In the case of a multiple layer structure, layers having the light emitting device 10, the holographic optical element 15 or the focusing lens 45, and the waveguides 20 and 50 are arranged to face one another. The light emitting device or light emitting array corresponding to each wavelength can be formed by repeating the same horizontal structure or multiple layer structure.

The optical path changers 30 and 58 selectively transmit or reflect light beams incident in different directions to proceed along the same optical path. The optical path changers 30 and 58 can be formed of first, second, and third dichroic filters 30a, 30b, and 30c, each reflecting or transmitting the light beams from the first through third light emitting devices or light emitting device arrays 10a, 10b, and 10c according to the wavelength thereof, as shown in FIG. 6. For example, a light beam having an R wavelength is emitted from the first light emitting device or light emitting device array 10a, a light beam having a G wavelength is emitted from the second light emitting device or light emitting device array 10b, and a light beam having a B wavelength is emitted from the third light emitting device or light emitting device array 10c.

The first dichroic filter 30a reflects only the light beam having the R wavelength and transmits the other light beams having the G and B wavelengths. The second dichroic filter 30b reflects only the light beam having the G wavelength and transmits the other light beams having the R and B wavelengths. The third dichroic filter 30c reflects only the light beam having the B wavelength and transmits the other light beams having the R and G wavelengths. Thus, when the light beam passing through the prism array 25 is incident on the first dichroic filter 30a, the light beam is reflected in a direction indicated by the 'A' arrows shown in FIG. 6. When the G light beam passing through the prism array 25 is incident on the second dichroic filter 30b, the light beam is reflected by the second dichroic filter 30b and passes through the first dichroic filter 30b and proceeds in the 'A' direction . Also, when the B light beam passing through the prism array 25 is incident on the third dichroic filter 30c, the light beam is reflected by the third dichroic filter 30c and passes through the second and first dichroic filters 30b and 30a and proceeds in the 'A' direction . As a result, the R, G, and B color light beams traveling along different paths can proceed along the same path.

Alternately, a cholesteric band modulation filter 35 to selectively reflect or transmit an incident light beam according to the polarization direction of the light beam can be used as the optical path changer, as shown in FIG. 7. With respect to a light beam having a predetermined wavelength, the cholesteric band modulation filter 35, for example, can change an optical path by reflecting a light beam of right circular polarization and transmitting a light beam of left circular polarization, or reversely, by transmitting the light beam of right circular polarization and reflecting the light beam of left circular polarization. The cholesteric band modulation filter 35 can be formed of first, second and third cholesteric band modulation filters 35a, 35b, and 35c which selectively transmit or reflect R, G, and B color light beams according to the polarization direction of each light beam.

To improve the efficiency of light by using both light beams of right polarization and left polarization, each of the first through third cholesteric band modulation filters 35a, 35b, and 35c includes a first mirror surface 37 to reflect a light beam of right polarization and transmit a light beam of left polarization, and a second mirror surface 38 to transmit the light beam of right polarization and reflect the light beam of left polarization, with respect to the wavelength corresponding to each filter. Here, the light beam of right circular polarization and the light beam of left circular polarization are indicated by + and −, respectively. For example, R+ denotes an R light beam of right circular polarization and R− denotes an R light beam of left circular polarization.

The R, G, and B color light beams passing through the light emitting device or light emitting device array 10 proceed toward the first, second, and third cholesteric band modulation filters 35a, 35b, and 35c, respectively. In the first, second, and third cholesteric band modulation filters 35a, 35b, and 35c, the first and second mirror surfaces 37 and 38 are provided in a diagonal direction with respect to a direction in which the light beam is input. Here, an example of a proceeding path of the R light beam will be described. When an R+ light beam of the R light beam passing through the prism array 25 first meets the first mirror surface 37, the light beam is reflected by the first mirror surface 37. Then, when the R+ light beam meets the second mirror surface 38, the light beam passes through the second mirror surface 38 to proceed in the 'A' direction. Also, when the R+ light beam first meets the second mirror surface 38, the light beam passes through the second mirror surface 38 and is reflected by the first mirror surface 37 to proceed in the 'A' direction. When an R− light beam of the R light beam passing through the prism array 25 first meets the first mirror surface 37, the light beam passes through the first mirror surface 37. Then, when the R− light beam meets the second mirror surface 38, the light beam is reflected by the second mirror surface 38 to proceed in the 'A' direction.

The above operation is equally applied to the G+ and G− light beams and the B+ and B− light beams so that all of the light beams proceed in the same direction ('A'). The first, second, and third cholesteric band modulation filters 35a, 35b, and 35c perform selective transmission or reflection operations with respect to only a light beam having a corresponding wavelength and transmit all of the other light beams having different wavelengths regardless of the polarization direction. Since both the light beams of right circular polarization and left circular polarization can be effectively used, the efficiency is very high.

Alternately, the optical path changer can be formed of an X prism 60 or X type dichroic filter film, as shown in FIG. 8. Here, the first, second, and third light emitting devices or light emitting device arrays 10a, 10b, and 10c are arranged to be separated from one another at a predetermined angle with respect to the X prism 60 or the X type dichroic filter film. The X prism 60 includes first, second, and third incident surfaces 61, 62, and 63 disposed to face the first, second, and third light emitting devices or light emitting device arrays 10a, 10b, and 10c, the holographic optical element 15, and the waveguide 20, and one exit surface 64. Also, the X prism 60 includes third and fourth mirror surfaces 60a and 60b, which are formed to cross each other to change an optical path by selectively transmitting or reflecting an incident light beam according to the wavelength of the light beam. For example, the third mirror surface 60a reflects an R light beam while transmitting G and B light beams. The fourth mirror surface 60b reflects the B light beam while transmitting the R and G light beams.

The R, G, and B color light beams emitted from the first through third light emitting devices or light emitting device arrays 10a, 10b, and 10c and passing through the holographic optical element 15, the waveguide 20, and the prism arrays 25, 26, 27, and 28 are incident on the corresponding first through third incident surfaces 61, 62, and 63 of the X prism 60. The R, G, and B color light beams input along different paths are transmitted through or reflected by the third and fourth mirror surfaces 60a and 60b to proceed in the same direction through the exit surface 64.

According to the above-described embodiments, the light emitting devices or light emitting device arrays 10a, 10b, and 10c can be arranged in various ways, or one of the optical path changers 30, 35, and 60 suitable for the arrangement of the light emitting devices or light emitting device arrays 10a, 10b, and 10c can be selected and arranged. Also, the above-described holographic optical element 15 can be replaced by at least one diffractive optical element having the same function. Further, in the second embodiment, one of the dichroic filter, the cholesteric band modulation filter, the X prism, and the X type dichroic filter film can be selected and used.

Figure 9:
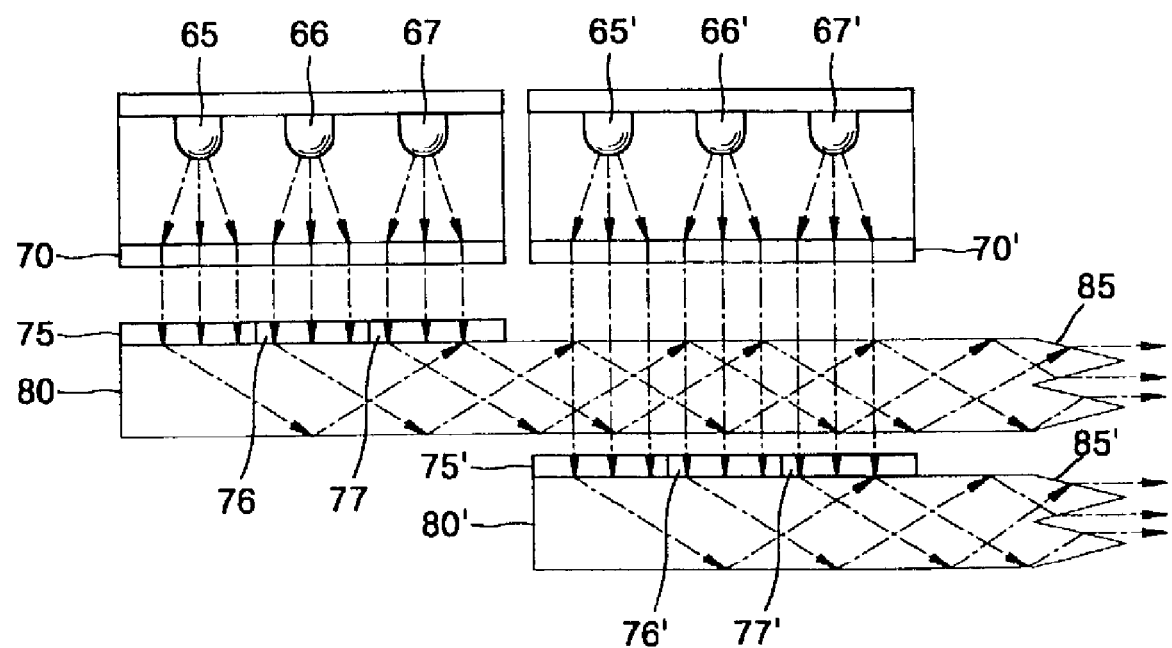
FIG. 9 is a view showing the structure of an illumination system according to a third embodiment of the present invention.

The third embodiment of the present invention, as shown in FIG. 9, includes fourth, fifth and sixth light emitting devices or light emitting device arrays 65, 66, and 67 to emit the R, G, and B color light beams, a parallel beam forming unit 70 to make parallel the light beams emitted from the fourth, fifth and sixth light emitting devices or light emitting device arrays 65, 66, and 67, fourth through sixth holographic optical elements 75, 76 and 77 to change the optical path of each of the R, G, and B color light beams at a predetermined angle, a waveguide 80 to totally reflect and pass the incident light beam passing through the holographic optical elements 75, 76, and 77, and a prism array 85 provided at an exit end portion of the waveguide 80.

The parallel beam forming unit 70 may be a Fresnel lens array or a collimating lens array. The R, G, and B color light beams emitted from the parallel beam forming unit 70 to be parallel to one another are incident on the waveguide 80 to be totally reflected, after passing through the corresponding fourth through sixth holographic optical elements 75, 76, and 77. Since the prism array 85 is integrally formed at the exit end portion of the waveguide 80, the light beams proceeding in different directions through the waveguide 80 are emitted in one direction to be parallel to one another. The prism array 85 can be formed integrally with the waveguide 80 or provided separately from the waveguide 80. Also, to secure a sufficient amount of light, light emitting devices or light emitting device arrays 65', 66', and 67' can be further provided. A parallel beam forming unit 70', holographic optical elements 75', 76', and 77', a waveguide 80', and a prism array 85', which correspond to the light emitting devices or light emitting device arrays 65', 66', and 67', are further provided in the same structure as described above. Here, the holographic optical elements 75', 76', and 77' and the waveguide 80' are arranged on a plane different from a plane of the holographic optical elements 75, 76, and 77 and the waveguide 80, so that optical paths thereof do not overlap.

According to the third embodiment of the present invention, as the R, G, and B color light beams are emitted from the fourth through sixth light emitting devices and light emitting device arrays 65, 66, and 67 by being sequentially turned on and off, a color image can be formed without loss of light. Since the R, G, and B color light beams proceed in the same path through the waveguide 80, an additional optical path changer is not necessary.

Figure 10:
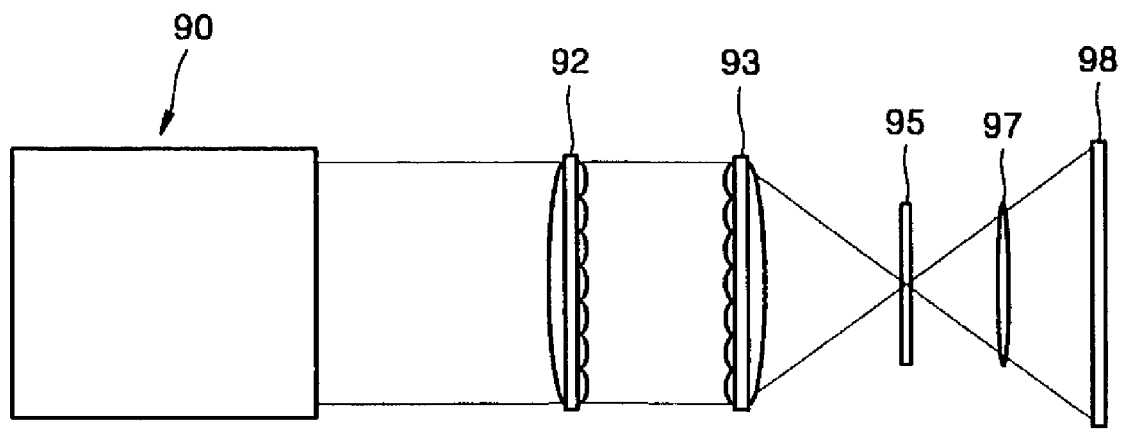
FIG. 10 is a view showing the structure of a projection system adopting the illumination system according to the present invention.

A projection system adopting the above-described illumination system will now be described, and is shown in FIG. 10. The projection system of FIG. 10 includes an illumination system 90 to emit a light beam, a display device 95 to form an image by using R, G, and B color light beams emitted from the illumination system 90, and a projection lens unit 97 to project the image formed by the display device 95 toward a screen 98. The illumination system 90, as shown in FIG. 2, includes at least one light emitting device 10 to emit a light beam having a predetermined wavelength, at least one holographic optical element 15 to change an optical path of the light beam emitted from the light emitting device 10, and a waveguide 20 to guide an incident light beam input through the holographic optical element 15.

The illumination system 90 is formed of one of the illumination systems according to the first through third embodiments of the present invention. Referring to FIGS. 2 and 4, an LED (light emitting diode), an LD (laser diode), an organic EL (electro luminescent), or an FED (field emission display) can be used as the light emitting device or the light emitting device array 10. The light emitting device or the light emitting device array 10 is formed of the first, second, and third light emitting devices or light emitting device arrays 10a, 10b, and 10c to emit R, G, and B color light beams. To secure a sufficient amount of light, additional ones of the light emitting devices 10a, 10b, and 10c, the holographic optical element 15, and the waveguide 20 can be further provided in the same structure in a horizontal or vertical direction. Here, the holographic optical element 15 can be replaced by a diffractive optical element having the same function.

Also, the prism array 25 to make parallel the light beam emitted from the waveguide 20 can be provided. As described above, the prism array 25 can be provided separate from the waveguide 20 or can be integrally formed at the exit end portion of the waveguide 20 (please refer to FIGS. 3A through 3C). Here, a fly eye lens 92 to uniformly distribute the R, G, and B color light beams to proceed in the same direction through the prism arrays 25, 26, 27, and 28, and a relay lens 93 to condense the light beam toward the display device 95, can be further provided. Accordingly, a color image is formed by the display device 95 by using the R, G, and B color light beams. The display device 95 can be a mobile mirror apparatus to realize a color image by means of an on-off switching operation of micro-mirrors according to an image signal, or an LCD device to realize a color image by polarizing and modulating an incident light beam.

Here, the illumination system 90 can further include an optical path changer 30 to synthesize light beams input from different directions by changing proceeding paths of the light beams to proceed in a single direction. The optical path changer 30 is disposed after the prism arrays 25, 26, 27, and 28.

The optical path changer 30 can be formed of the first through third dichroic filters 30a, 30b, and 30c to change proceeding paths of the R, G, and B color light beams by selectively transmitting or reflecting according to the wavelength of each incident light beam. The R, G, and B color light beams proceeding in the same direction through the first through third dichroic filters 30a, 30b, and 30c are uniformly condensed by the fly eye lens 92 and the relay lens 93 to form a color image in conjunction with the display device 95.

Here, although the first through third dichroic filters 30a, 30b, and 30c are used as the optical path changer 30 in the above description, the cholesteric and modulation filter 35 to transmit or reflect an incident light beam according to the direction of circular polarization of the light beam can also be used. Also, the X prism 60 or X type dichroic filter can be used to change the optical paths of the R, G, and B color light beams input from different directions to proceed in the same direction. Here, the first through third light emitting devices or light emitting device arrays 10a, 10b, and 10c to emit the R, G, and B color light beams are arranged to be separated from one another at a predetermined angle with respect to the X prism 60 or X type dichroic filter, as shown in FIG. 8.

In another embodiment, the illumination system 90 may include a light emitting device or light emitting device array 40, a focusing lens 45 to condense the light beam emitted from the light emitting device or light emitting device array 40, and a waveguide 50 having a reflection surface 48 inclined at a predetermined angle so that the light beam condensed by the focusing lens 45 is totally reflected. The second parallel beam forming unit 55, such as a collimating lens or a Fresnel lens, to make the light beam passing through the waveguide 50 a parallel beam, is further provided.

The light beam made parallel by the parallel beam forming unit 55 is made uniform by the fly eye lens array 92 and condensed on the display device 95 by the relay lens 93. Here, since an optical path changer such as the first through third dichroic filters 30a, 30b, and 30c, the cholesteric band modulation filter 35 or the X prism or X type dichroic filter 60 can be inserted after the second parallel beam forming unit 55 as described above, a detailed description thereof will be omitted.

Also, the projection system according to the present invention, as shown in FIG. 9, can adopt an illumination system in which the R, G, and B color light beams incident on the waveguide 80 through the fourth through sixth holographic optical elements 75, 76, and 77 proceed in the same direction. In this case, since the R, G, and B color light beams proceed along the same optical path through the single waveguide 80, an additional optical path changer is not needed. Thus, the volume of the projection system can be reduced.

The R, G, and B color light beams emitted from the illumination system according to the above various embodiments of the present invention are incident on the display device 95 via the fly eye lens 92 and the relay lens 93 to form a color image. The color image is magnified by the projection lens unit 97 and focused on the screen 98.

As described above, in the illumination system according to the present invention, since a light emitting device or light emitting device array to emit a light beam having a narrow spectrum in a desired wavelength band is used, color purity is improved and color gamut having a wider distribution can be secured. Since the cross section of a light beam is reduced by the holographic optical element or diffractive optical element and the waveguide, the illumination system can be made compact and loss of light can be reduced. Also, as the light beam condensed at one point by the focusing lens proceeds through the waveguide, the cross section of the light beam can be further reduced. Further, less heat is generated and lifespan is lengthened, as compared to the conventional lamp light source.

Also, in the projection system adopting the illumination system according to the present invention, since time sequential driving is possible by the illumination system having a light emitting device or light emitting device array, a color wheel is not needed. Also, an on/off switching operation which is faster than the rotation speed of the color wheel is possible, and thus, a high frame rate can be realized and power consumption can be reduced. Therefore, the projection system adopting the illumination system according to the present invention can provide a high resolution and high quality image.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An illumination system comprising:
   a light emitting device to emit a light beam having a wavelength;
   a holographic optical element to change an optical path of the light beam emitted from the light emitting device; and
   a waveguide to receive the light beam from the holographic optical element and to guide the received light beam,
   an input direction of the light beam into the waveguide being perpendicular to a transmission direction of the light beam through the waveguide and an output direction of the light beam from the waveguide.

2. The illumination system as claimed in claim 1, wherein the light emitting device has an array structure.

3. The illumination system as claimed in claim 2, wherein the light emitting device is a light emitting diode (LED), a laser diode, an organic electro luminescent (EL), or a field emission display (FED).

4. An illumination system comprising:
   a light emitting device having an array structure to emit a light beam having a wavelength;
   a holographic optical element to change an optical path of the light beam emitted from the light emitting device;
   a waveguide to receive the light beam from the holographic optical element and to guide the received light beam; and
   a prism array to receive the guided light beam from the waveguide and to make parallel the received light beam so that the parallel light beam proceeds in one direction,
   wherein the light emitting device is a light emitting diode (LED), a laser diode, an organic electro luminescent (EL), or a field emission display (FED).

5. The illumination system as claimed in claim 4, wherein the holographic optical element is arranged at a first or second end portion of the waveguide.

6. The illumination system as claimed in claim 5, further comprising a parallel beam forming unit to make parallel the light beam emitted from the light emitting device.

7. The illumination system as claimed in claim 6, wherein the parallel beam forming unit is a collimating lens array or a Fresnel lens array.

8. The illumination system as claimed in claim 5, further comprising an optical path changer to receive the parallel light beam from the prism array and to change a proceeding path of the received light beam.

9. The illumination system as claimed in claim 8, wherein a plurality of the light emitting devices are arranged in a line.

10. The illumination system as claimed in claim 9, wherein the optical path changer is a dichroic filter to reflect or transmit the light beam passing through the prism array according to the wavelength thereof.

11. The illumination system as claimed in claim 9, wherein the optical path changer is a cholesteric band modulation filter to reflect or transmit the light beam passing through the prism array according to a polarization direction and the wavelength of the light beam.

12. The illumination system as claimed in claim 11, wherein the cholesteric band modulation filter comprises:
    a first mirror surface to reflect the light beam of a right circular polarization and to transmit a light beam of a left circular polarization, and
    a second mirror surface to transmit the light beam of a right circular polarization and to reflect the light beam of a left circular polarization according to the wavelength of the light beam.

13. The illumination system as claimed in claim 9, wherein the light emitting device, the holographic optical element, and the waveguide are arranged in a multiple layer structure.

14. The illumination system as claimed in claim 8, further comprising a plurality of the light emitting devices separated at an angle.

15. The illumination system as claimed in claim 14, wherein the optical path changer is an X prism or X type dichroic filter.

16. The illumination system as claimed in claim 14 wherein the light emitting device, the holographic optical element, and the waveguide are arranged in a multiple layer structure.

17. The illumination system as claimed in claim 4, wherein the prism array is formed integrally with the waveguide at an exit end portion of the waveguide.

18. An illumination system comprising:
    a plurality of light emitting devices to emit light beams having different wavelengths;

a plurality of holographic optical elements, corresponding to the light emitting devices, to change optical paths of the light beams emitted from the light emitting devices; and a waveguide to guide light beams incident from the holographic optical elements in a same direction, an input direction of the light beams into the waveguide being perpendicular to a transmission direction of the light beams through the waveguide and an output direction of the light beams from the waveguide.

19. The illumination system as claimed in claim 18, wherein the light emitting devices have an array structure.

20. The illumination system as claimed in claim 18, wherein each of the light emitting devices is a light emitting diode (LED), a laser diode, an organic electro luminescent (EL), or a field emission display (FED).

21. The illumination system as claimed in claim 20, wherein the holographic optical element is arranged at a first or second end portion of the waveguide.

22. An illumination system comprising:
a plurality of light emitting devices having an array structure to emit light beams having different wavelengths;
a plurality of holographic optical elements, corresponding to the light emitting devices, to change optical paths of the light beams emitted from the light emitting devices;
a waveguide to guide light beams incident from the holographic optical elements in a same direction; and
a prism array to receive the guided light beam from the waveguide and to make the light beam parallel so that the parallel light beam proceeds in one direction,
wherein each of the light emitting devices is a light emitting diode (LED), a laser diode, an organic electro luminescent (EL), or a field emission display (FED).

23. The illumination system as claimed in claim 22, wherein the prism array is formed integrally with the waveguide at an exit portion of the waveguide.

24. An illumination system comprising:
a plurality of light emitting devices to emit light beams having different wavelengths;
a plurality of holographic optical elements, corresponding to the light emitting devices, to change optical paths of the light beams emitted from the light emitting devices;
a waveguide to guide light beams incident from the holographic optical elements in a same direction; and
a parallel beam forming unit to make parallel the light beam emitted from each of the light emitting devices,
wherein each of the light emitting devices is a light emitting diode (LED), a laser diode, an organic electro luminescent (EL), or a field emission display (FED) and the holographic optical element is arranged at a first or second end portion of the waveguide.

25. The illumination system as claimed in claim 24, wherein the parallel beam forming unit is a collimating lens array or Fresnel lens array.

26. An illumination system comprising:
a light emitting device to emit a light beam having different wavelengths;
a focusing lens to condense the light beam emitted from the light emitting device; and
a waveguide having an inclined incident surface, upon which the condensed light is incident,
an input direction of the light beam into the waveguide being perpendicular to a transmission direction of the light beam through the waveguide and an output direction of the light beam from the waveguide.

27. An illumination system comprising:
a light emitting device to emit a light beam having different wavelengths;
a focusing lens to condense the light beam emitted from the light emitting device; and
a waveguide having an inclined incident surface, upon which the condensed light is incident,
wherein the light emitting device has an array structure.

28. The illumination system as claimed in claim 27, wherein the light emitting device is a light emitting diode (LED), a laser diode, an organic electro luminescent (EL), or a field emission display (FED).

29. The illumination system as claimed in claim 28, further comprising a first parallel beam forming unit to make parallel the light beam emitted from the light emitting device.

30. The illumination system as claimed in claim 29, further comprising a second parallel beam forming unit to receive the incident light after the incident light has passed through the waveguide and to make parallel the received light beam.

31. The illumination system as claimed in claim 30, wherein the first and second parallel beam forming units are collimating lens arrays or Fresnel lens arrays.

32. The illumination system as claimed in claim 31, further comprising an optical path changer to change a proceeding path of the light beam passing through the second parallel beam forming unit by selectively transmitting or reflecting the light beam.

33. The illumination system as claimed in claim 32, further comprising a plurality of the light emitting devices arranged in a line.

34. The illumination system as claimed in claim 33, wherein the optical path changer is a dichroic filter to reflect or transmit the light beam passing through the second parallel beam forming unit according to the wavelength thereof.

35. The illumination system as claimed in claim 33, wherein the optical path changer is a cholesteric band modulation filter to reflect or transmit the light beam passing through the second parallel beam forming unit according to a polarization direction and the wavelength thereof.

36. The illumination system as claimed in claim 35, wherein the cholesteric band modulation filter comprises:
a first mirror surface to reflect the light beam of a right circular polarization and to transmit the light beam of a left circular polarization, and
a second mirror surface to transmit the light beam of the right circular polarization and to reflect the light beam of the left circular polarization according to the wavelength of the light beam.

37. The illumination system as claimed in claim 33, wherein the light emitting device, the focusing lens, and the waveguide are arranged in a multiple layer structure.

38. The illumination system as claimed in claim 32, wherein a plurality of the light emitting devices are separated at an angle.

39. The illumination system as claimed in claim 38, wherein the optical path changer is an X prism or an X type dichroic filter.

40. The illumination system as claimed in claim 38, wherein the light emitting device, the focusing lens, and the waveguide are arranged in a multiple layer structure.

41. The illumination system as claimed in claim 40, wherein the multiple layer structure is a symmetrical structure.

42. An illumination system comprising:
a plurality of light emitting devices to emit a plurality of light beams having different wavelengths;
a diffractive optical element to change an optical path of the light beams emitted from the light emitting devices; and
a waveguide to guide the light beams which have passed through the diffractive optical element,
an input direction of the light beams into the waveguide being perpendicular to a transmission direction of the light beams through the waveguide and an output direction of the light beams from the waveguide.

43. The illumination system as claimed in claim 42, wherein the light emitting devices have an array structure.

44. The illumination system as claimed in claim 43, wherein the light emitting devices are a light emitting diode (LED), a laser diode, an organic electro luminescent (EL), or a field emission display (FED).

45. An illumination system comprising:
a plurality of light emitting devices to emit a plurality of light beams having different wavelengths;
a diffractive optical element to change an optical path of the light beams emitted from the light emitting devices;
a waveguide to guide the light beams which have passed through the diffractive optical element; and
a prism array to receive the guided light beams from the waveguide to make parallel the received light beams so that the parallel light beams proceed in one direction,
wherein the light emitting devices have an array structure, and the light emitting devices are a light emitting diode (LED), a laser diode, an organic electro luminescent (EL), or a field emission display (FED).

46. The illumination system as claimed in claim 45, further comprising a parallel beam forming unit to make parallel the light beams emitted from the light emitting devices.

47. The illumination system as claimed in claim 46, wherein the parallel beam forming unit is a collimating lens array or Fresnel lens array.

48. A projection system comprising:
a plurality of light emitting devices to emit a plurality of light beams having different wavelengths;
a holographic optical element to change a proceeding path of the light beams emitted from the light emitting devices;
a waveguide to guide the light beams passing through the holographic optical element,
an input direction of the light beams into the waveguide being perpendicular to a transmission direction of the light beams through the waveguide and an output direction of the light beams from the waveguide;
a display device to form an image by processing the light beams passing through the waveguide according to an input image signal;
a screen; and
a projection lens unit to magnify the image formed by the display device and to project the magnified image toward the screen.

49. The projection system as claimed in claim 48, wherein the light emitting devices have an array structure.

50. The projection system as claimed in claim 49, wherein the light emitting devices are a light emitting diode (LED), a laser diode, an organic electro luminescent (EL), or a field emission display (FED).

51. A projection system comprising:
a plurality of light emitting devices to emit a plurality of light beams having different wavelengths;
a holographic optical element to change a proceeding path of the light beams emitted from the light emitting devices;
a waveguide to guide the light beams passing through the holographic optical element;
a display device to form an image by processing the light beams passing through the waveguide according to an input image signal;
a screen;
a projection lens unit to magnify the image formed by the display device and to project the magnified image toward the screen; and
a prism array to receive the guided light beams from the waveguide and to make parallel the received light beams,
wherein the light emitting devices have an array structure, and the light emitting devices are a light emitting diode (LED), a laser diode, an organic electro luminescent (EL), or a field emission display (FED).

52. The projection system as claimed in claim 51, wherein the prism array is formed integrally with the waveguide at an exit end portion of the waveguide.

53. The projection system as claimed in claim 52, further comprising:
a fly eye lens to receive the parallel light beams from the prism array and to make uniform an intensity of the received light beams; and
a relay lens to condense the uniform light beams which have passed through the fly eye lens on the display device.

54. The projection system as claimed in claim 53, further comprising a parallel beam forming unit to make parallel the light beams emitted from the light emitting devices.

55. The projection system as claimed in claim 54, wherein the parallel beam forming unit is a collimating lens array or a Fresnel lens array.

56. The projection system as claimed in claim 52, further comprising an optical path changer to receive the parallel light beams from the prism array and to change a proceeding path of the received light beams.

57. The projection system as claimed in claim 56, further comprising:
a fly eye lens to receive the parallel light beams from the prism array and to make uniform an intensity of the received light beams; and
a relay lens to condense the uniform intensity light beams from the fly eye lens on the display device.

58. A projection system comprising:
a plurality of light emitting devices to emit a plurality of light beams having different wavelengths;
a focusing lens to condense the light beams emitted from the light emitting devices;
a waveguide having an inclined surface upon which the condensed light is incident;
a display device to form an image by processing the light beams passing through the waveguide according to an input image signal;
a screen; and
a projection lens unit to magnify the image formed by the display device and to project the magnified image toward a screen,
an input direction of the light beams into the waveguide being perpendicular to a transmission direction of the light beams through the waveguide and an output direction of the light beams from the waveguide.

59. The projection system as claimed in claim 58, wherein the light emitting devices have an array structure.

60. The projection system as claimed in claim 59, wherein the light emitting devices are a light emitting diode (LED), a laser diode, an organic electro luminescent (EL), or a field emission display (FED).

61. A projection system comprising:
a plurality of light emitting devices to emit a plurality of light beams having different wavelengths;
a focusing lens to condense the light beams emitted from the light emitting devices;
a waveguide having an inclined surface upon which the condensed light is incident;
a display device to form an image by processing the light beams passing through the waveguide according to an input image signal;
a screen;
a projection lens unit to magnify the image formed by the display device and to project the magnified image toward a screen; and
a first parallel beam forming unit to make parallel the light beams emitted from the light emitting devices,
wherein the light emitting devices have an array structure, and the light emitting devices are a light emitting diode (LED), a laser diode, an organic electro luminescent (EL), or a field emission display (FED).

62. The projection system as claimed in claim 61, further comprising a second parallel beam forming unit to make parallel the light beams passing through the waveguide.

63. The projection system as claimed in claim 62, further comprising:
a fly eye lens to make uniform a strength of the light beams emitted from the second parallel beam forming unit uniform; and
a relay lens to condense the light beams passing through the fly eye lens on the display device.

64. The projection system as claimed in claim 63, further comprising:
an optical path changer, provided between the second parallel beam forming unit and the fly eye lens, to change a proceeding path of the light beams passing through the second parallel beam forming unit by selectively transmitting or reflecting the light beams.

65. The projection system as claimed in claim 62, wherein the first and second parallel beam forming units are collimating lens arrays or Fresnel lens arrays.

66. A projection system comprising:
a plurality of light emitting devices to emit light beams having different wavelengths;
a plurality of holographic optical elements to change respective proceeding paths of the light beams emitted from the light emitting devices;
a waveguide to guide the light beams input through the holographic optical elements to proceed in a same direction;
a display device to form an image by processing the light beam passing through the waveguide according to an input image signal;
a screen; and
a projection lens unit to magnify the image formed by the display device and to project the magnified image towards the screen,
an input direction of the light beams into the waveguide being perpendicular to a transmission direction of the light beams through the waveguide and an output direction of the light beams from the waveguide.

67. The projection system as claimed in claim 66, wherein the light emitting device has an array structure.

68. The projection system as claimed in claim 67, wherein the light emitting device is a light emitting diode (LED), a laser diode, an organic electro luminescent (EL), or a field emission display (FED).

69. A projection system comprising:
a plurality of light emitting devices to emit light beams having different wavelengths;
a plurality of holographic optical elements to change respective proceeding paths of the light beams emitted from the light emitting devices;
a waveguide to guide the light beams input through the holographic optical elements to proceed in a same direction;
a display device to form an image by processing the light beam passing through the waveguide according to an input image signal;
a screen;
a projection lens unit to magnify the image formed by the display device and to project the magnified image towards the screen; and
a prism array to receive the guided light beam from the waveguide and to make parallel the received light beam,
wherein the light emitting device has an array structure, and the light emitting device is a light emitting diode (LED), a laser diode, an organic electro luminescent (EL), or a field emission display (FED).

70. The projection system as claimed in claim 69, wherein the prism array is formed integrally with the waveguide at an exit portion of the waveguide.

71. The projection system as claimed in claim 69, further comprising:
a fly eye lens to make uniform an intensity of the parallel light beam of the prism array; and
a relay lens to condense the uniform light beam of the fly eye lens on the display device.

72. An illumination system comprising:
a light emitting device to emit a light beam having a wavelength;
a light receiving element to reduce a cross section of the light beam emitted from the light emitting device; and
a waveguide to receive the reduced light beam from the light receiving element and to guide the received light beam,
an input direction of the light beam into the waveguide being perpendicular to a transmission direction of the light beam through the waveguide and an output direction of the light beam from the waveguide.

73. The illumination system as claimed in claim 72, wherein the light receiving element is a holographic optical element to change an optical path of the light beam emitted from the light emitting device.

74. The illumination system as claimed in claim 72, further comprising a plurality of the light emitting devices arranged in an array.

75. The illumination system as claimed in claim 72, wherein the light receiving element is a focusing lens to condense the light beam emitted from the light emitting device.

76. An illumination system comprising:
- a light emitting device to emit a light beam having a wavelength;
- a light receiving element to reduce a cross section of the light beam emitted from the light emitting device;
- a waveguide to receive the reduced light beam from the light receiving element and to guide the received light beam; and
- a prism to receive the guided light beam from the waveguide and to make parallel the received light beam so that the parallel light beam proceeds in one direction.

77. The illumination system as claimed in claim 76, wherein the prism is an end portion of the waveguide comprising a first prism surface having first, and second inclined surfaces.

78. The illumination system as claimed in claim 77, wherein the prism further comprises a second prism surface having third and fourth inclined surfaces.

* * * * *